United States Patent [19]
Gatto et al.

[11] Patent Number: 5,905,521
[45] Date of Patent: May 18, 1999

[54] TELEVISION SYSTEM IN A DIGITAL OR ANALOG NETWORK

[75] Inventors: Jean Marie Gatto, Paris; Dominique Bertrand, 6 Rue Lacaille, 75017 Paris, both of France

[73] Assignees: Jean-Marie Gatto, London, United Kingdom; Dominique Bertrand, Morley, Australia

[21] Appl. No.: 08/554,436

[22] Filed: Nov. 6, 1995

[30] Foreign Application Priority Data

Nov. 9, 1994 [FR] France .................................. 94 13469

[51] Int. Cl.⁶ .............................. H04N 7/10; H04N 7/14
[52] U.S. Cl. .................................. 348/6; 348/12; 348/13; 345/327; 455/4.1
[58] Field of Search .................................. 348/12, 13, 17, 348/18, 19; 345/327; 325/200.47, 200.48, 200.49; 455/3.1, 4.1, 4.2, 5.1, 6.3; H04N 7/10, 7/14

[56] References Cited

U.S. PATENT DOCUMENTS

| | | |
|---|---|---|
| 4,829,558 | 5/1989 | Welsh . |
| 4,860,123 | 8/1989 | McCalley et al. . |
| 5,247,347 | 9/1993 | Litteral et al. ............................ 455/4.2 |
| 5,247,575 | 9/1993 | Spraque et al. ............................ 455/2 |
| 5,333,266 | 7/1994 | Boaz et al. ............................ 395/200 |
| 5,359,367 | 10/1994 | Stockill . |
| 5,365,264 | 11/1994 | Inoue et al. ............................ 348/12 |
| 5,410,326 | 4/1995 | Goldstein ............................ 348/134 |
| 5,534,913 | 7/1996 | Majeti et al. ............................ 348/12 |
| 5,562,550 | 10/1996 | Chartrand ............................ 473/131 |
| 5,594,789 | 1/1997 | Seazholtz et al. ............................ 348/13 |
| 5,608,447 | 3/1997 | Farry et al. ............................ 348/7 |
| 5,621,456 | 4/1997 | Florin et al. ............................ 348/12 |
| 5,684,918 | 11/1997 | Abecassis ............................ 386/83 |
| 5,694,546 | 12/1997 | Reisman ............................ 395/200.9 |

FOREIGN PATENT DOCUMENTS

| | | |
|---|---|---|
| 0477786 | 4/1992 | European Pat. Off. . |
| 2244896 | 12/1991 | United Kingdom . |
| 93/15466 | 8/1993 | WIPO . |

*Primary Examiner*—Bryan Tung
*Assistant Examiner*—Nhon T. Diep
*Attorney, Agent, or Firm*—Pearne, Gordon, McCoy & Granger LLP

[57] ABSTRACT

An economic television system used in a digital or analog network (24) incorporating at least one user identification device, at least monodirectional or bidirectional connector to data systems and at least one image, sound and data decompression and/or compression element. This system also comprises at least one instantaneous acquisition means. Application to the fields of interactive multitransactions, remote monitoring, simultaneous transaction or other communications uses.

19 Claims, 4 Drawing Sheets

TELEVISION SYSTEM IN A DIGITAL OR ANALOG NETWORK

TECHNICAL FIELD

The present invention relates to a television system in a digital or analog network, said system functioning very economically compared with existing systems.

PRIOR ART

The present evolution of technology is towards rendering ever more common-place data technology and an ever more advanced introduction thereof into the life of each individual. In the short or medium term the use of the computer will become a necessity in the organization of the everyday life of the population. However, the present inventors consider that computer science is too complicated a technology to be used by most individuals.

Therefore the object of the invention is not to make the use of a computer as current as that of a television receiver, but instead to increase the field of use of television by linking it with data processing systems by means of digital or analog networks.

The invention relates to a television system usable in a digital or analog network, in which the user takes a decision and can, as soon as this decision is taken, carry out an immediate validation with or without the aid of an ordering means. This system functions very economically compared with existing systems and requires no supplementary use of the telephone, Minitel, etc. It is very simple to carry out by the user and avoids the use of a complex loop or circuit.

DESCRIPTION OF THE INVENTION

The present invention relates to a television system used in a digital or analog network, characterized in that it comprises at least one user identification means, at least one means for the monodirectional or bidirectional connection to data processing systems and at least one picture, sound and data decompression and/or compression means.

This system also comprises at least one instantaneous acquisition means.

Advantageously the system according to the invention comprises an optical disk reader or reader/recorder of the CD-ROM type and a remote ordering device.

Advantageously the system according to the invention comprises:
  a module for the encoding and/or decoding and compression and/or decompression of digital informations,
  a user identification module,
  a module for validating an order linked with an ordering device available to a user (microphone, light pen, touch screen, remote control, etc.),
  a module for receiving informations from an analog or digital network inter alia permitting the return of an acknowledgement of receipt signal and/or an information transmission module to an analog or digital network inter alia permitting the acceptance of an order,
  a video camera,
  a processing unit for these different modules.

The two transmission/reception modules also make it possible to transmit or receive any type of analog or digital information such as e.g. digital or non-digital sound, non-digital or digital pictures, data, etc.

Advantageously all these elements are integrated into a digital or non-digital commercially available television receiver or, in a first variant, all said elements are placed in a separate box connected to the television receiver, so as to permit the immediate use of any random commercially available television receiver.

Thus, the system according to the invention advantageously functions on a novel type of television, but can also be adapted to a standard television.

The system according to the invention advantageously also has an input/output module connectable to one or more "non-intelligent", standard peripherals, such as a printer, a bar code reader, a light pen, etc. It also has an input/output module connectable to a local data processing network. The latter can advantageously comprise a personal computer e.g. used for the storage of informations transmitted or received by the television.

The identification means can e.g. be an electronic card reading module, or a module for receiving a code which can be transmitted by a remote control, whereby all or part of said code may already be incorporated into the apparatus. This operation can also be controlled by the voice of the user.

In an advantageously use example, the system according to the invention comprises at least one camera associated with at least one remotely or non-remotely controllable microphone making it possible to return a colour or non-colour, moving or fixed picture and/or sound coming from the user, the data from each camera then being fed into at least one data compression means.

Advantageously the system according to the invention incorporates means for the real time processing of the picture and sound, e.g. a digital signal processor (DSP) permitting the effecting of modifications such as the blanking out of all or part of the picture and/or sound by substitution of another component.

Advantageously the system according to the invention comprises a teleloadable "macro-routine" loading means.

It also comprises a processing unit permitting the control of all transactions, the routing of messages from at least one transmitter, the sorting of messages sent by the user and the sending back of messages in the desired direction.

Advantageously the "macro-routines" can influence its parameters.

A memory is associated with the processing unit and a disk operating on a read-write basis may permit an extension of the memory.

Advantageously at least one encrypting means is associated with the decompression and/or compression means or with the processing unit.

The system of the invention renders immediate a large number of uses of a television for which the return of information at present takes place with a time lag, e.g. sounding or polling during a televised debate, games, purchasing control centres all requiring the use of the telephone or Minitel (registered trademark) as return means. It can be used with transmissions broadcast on a public television chain, but obviously also in a private television network. Advantageously in a transmission received is already included the return code to where the informations must pass, as well as the transactional processing protocol with said informations.

In an application to remote shopping, the system according to the invention enables any random television user to shop from a distance.

Such a system makes it possible to instantaneously accept an order decision by a user in a remote shopping system with the assurance that the order has indeed been taken.

This system permits a direct relation between the television and the information return without any formality having to be fulfilled on the part of the user, except purchasing by acting on the order means or device after having been identified.

The system according to the invention is also usable in a sounding or polling application, in an interactive conference application, in an application of interactive games means with or without the use of money and in any application requiring an absolute validation with identification of the user and/or the service sent by him. It can also be used in a remote monitoring application and in a simultaneous translation application.

DETAILED DESCRIPTION OF EMBODIMENTS

Figure 1:
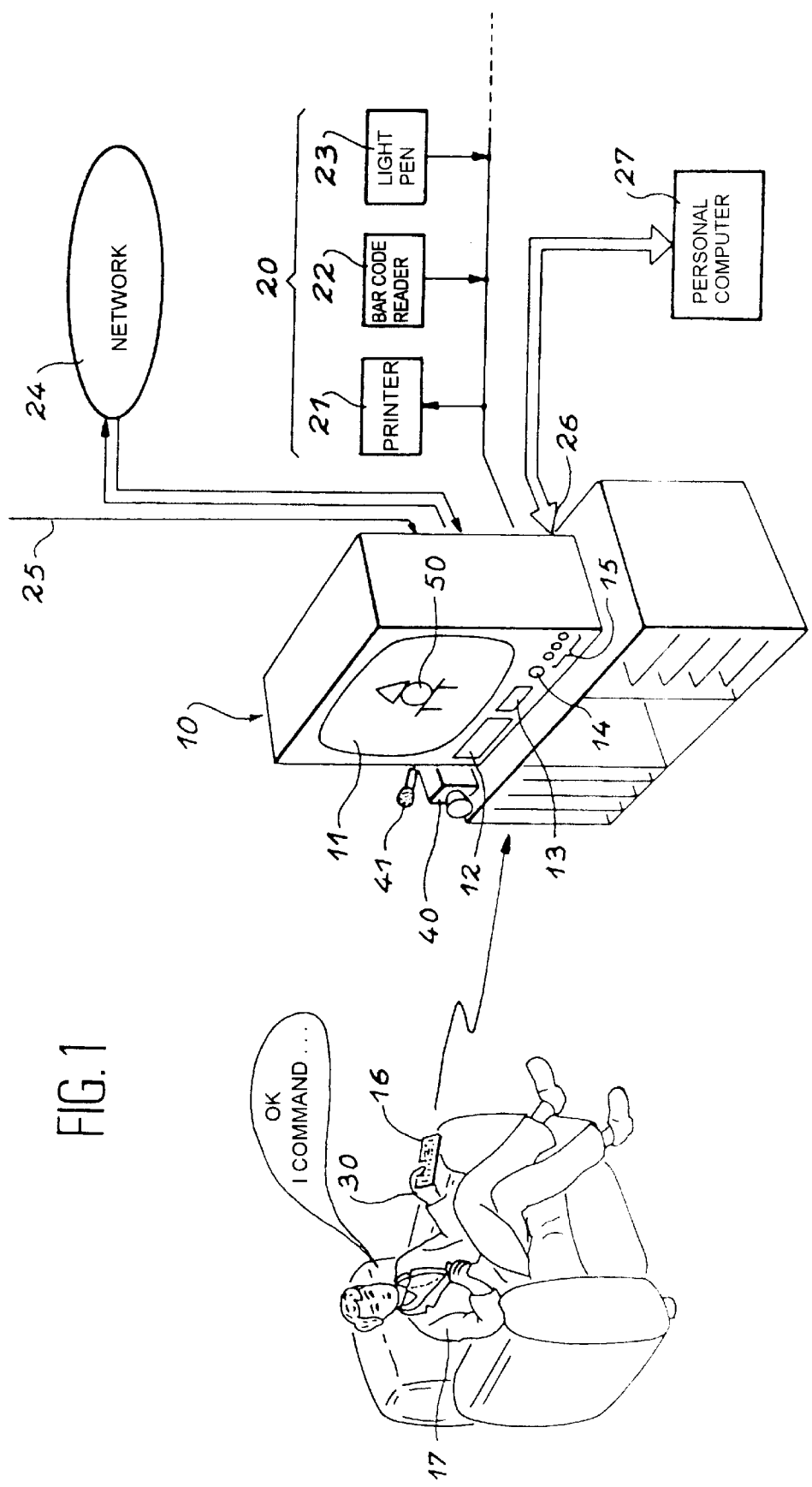
FIG. 1 illustrates the system according to the invention.

The system according to the invention is a television system in an analog or digital, information return network, comprising at least one means for identifying a user, at least one means for the monodirectional or bidirectional connection to data processing systems, at least one compression and/or decompression means and/or an instantaneous acquisition means. An encrypting system can be added thereto. An embodiment of said system is shown in FIG. 1.

The television 10 according to the invention with its screen 11 comprises an optical disk reader 12 such as a CD-ROM, an identification module 13, e.g. a chip card reader, a remote control signal reception module 14 and various indicator lights 15 indicating the operating state of the television receiver.

In the present embodiment, a remote control 16 is available to the user 17. In another embodiment, the user has a touch screen. In a third embodiment, the user passes his instructions directly using a microphone.

This television receiver is firstly coupled to different peripherals 20, e.g. a printer 21, a bar code reader 22 and a light pen 23, a magnetic card reader, a touch screen, a code reader or a chip card reader, etc. It is also coupled to a digital or analog, information outward and/or return network 24 and optionally to an analog or digital display information input 25, via an antenna. Advantageously said television receiver also has a computer peripherals and terminals outlet 26 for communicating to a local data processing network permitting the connection of personal computers 27. For example, a personal computer or PC 27 can then be used for the storage of informations transmitted or received by the television. This feature also makes it possible to render the television "intelligent".

The system according to the invention comprises a processing unit which can control all transactions, route messages coming from at least one transmitter, who can be a supplier, or a customer in the other direction, sort messages sent by the user and send back messages in the desired direction.

It therefore selects and reroutes all signals, no matter what their type and may or may not offer certain choices to the user.

The system according to the invention can be personalized as a function of use, using teleloadable macro-instructions or macro-routines. The digital or analog network 24 can then teleload a program end in a simple language with the subsequent possibility of local decisions.

During operation, after having been identified, e.g. by introducing a chip card, sending a code e.g. with the aid of the remote control 16 following a control 30 or by implicit identification by the line number, the user makes a selective choice of the informations appearing on the screen and then carries out an immediate validation, e.g. by pressing a button on the remote control 16.

This information is immediately returned to the network 24 in order for said information to be accepted by a data processing server. This server can e.g. send back an acceptance information, which can be displayed in overprinting on the screen, or which can be sound broadcast. Such a server is advantageously the responsibility of the product supplier.

The information transfer is completely transparent for users. Only the use of an acquisition means 16 is necessary, such as e.g. a microphone or a remote control.

The system of the invention permits the validation of a transaction. Firstly the user is identified, then an order is validated and finally the order is confirmed.

The television receiver according to the invention can be identified by a unique, internal, specific code number.

Figure 2:
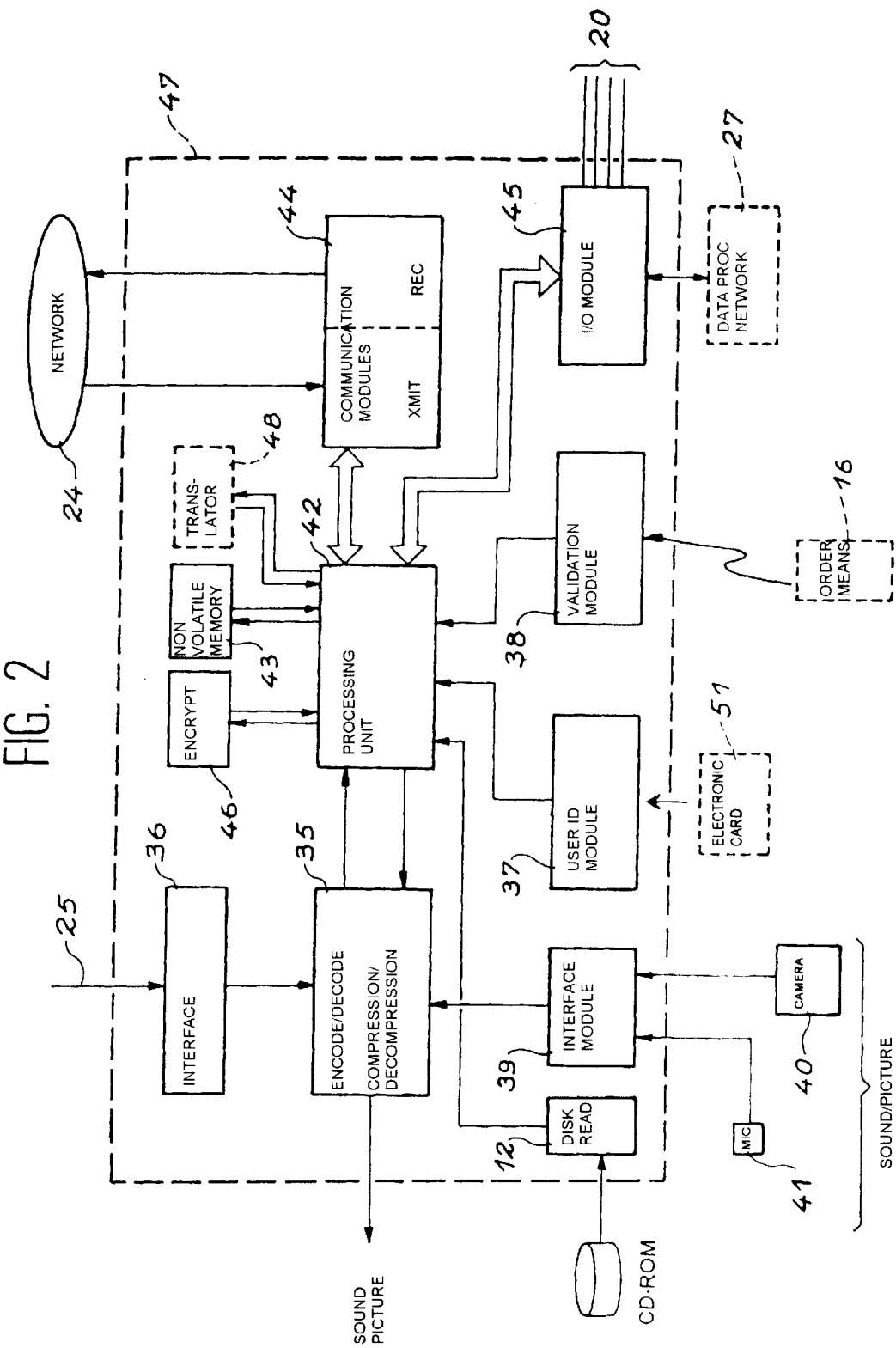
FIG. 2 shows a block diagram of modules forming the system of the invention.

As shown in FIG. 2, the system according to the invention comprises:

a module for the encoding and/or decoding, compression and/or decompression 35 of digital television information sent on the screen and/or to a loudspeaker receiving the analog or digital reception signal 25 across an interface 36, decompression being performable on the basis of all existing formats (audio, video and data), a user identification module 37, an order validation module 38 linked with the ordering means 16 available to the user 17, one or more analog or digital information transmission-reception modules (picture, sound, text) to or from the digital or analog network 24 inter alia permitting the acceptance of an order and the return of an acknowledgement of receipt signal and data, optionally an interface module 39 connected to at least a camera 40 and to at least one microphone 41, a processing unit 42 for the said modules, said processing unit being connected to a memory 43.

The volatile or non-volatile memory 43 stores in particular "macro-routines" and sound or picture data. Its capacity can be increased according to the different needs of users.

The term memory as used here is of a very generic nature and in the case where a large volume is involved, the extension thereof can be a disk operating on a read-write basis. The user can e.g. store in said memory a batch of "fragments chosen by him" and which can be used at any time, or even during the switching on or initialization phase of the television. It also permits a "scratch pad"-type use.

The system of the invention is linked with the network 24 across one or more communication modules 44 (transmission, reception).

The system of the invention is connected to various conventional, non-intelligent peripherals 20 (acquisition, restoration) and to a local data processing network 27 across an input-output module 45. These peripherals can e.g. be a printer, a light pen or a bar code reader.

The module or modules 35 for encoding and/or decoding, compressing and/or decompressing of digital television information make it possible to decompress and/or decode said digital informations dispatched by a public television chain or in a private television network and received across the interface module 36.

Very simple, but very high performance encrypting means 46 is associated with the compression-decompression system. This means permits the confidentiality of all the data received or transmitted by the user or supplier.

The system of the invention also comprises a CD-ROM reader or reader/recorder 12. These CD-ROM's can be of different types: CD1, CDP, video CD, audio CD. A CD-ROM makes it possible to store several hundred megabytes. This can e.g. be all the electrical domestic appliances in France or a mail order catalogue, etc.

There are very numerous applications for the system according to the invention and examples are given below.

The system of the invention makes it possible to read such a CD-ROM and perform a purchase, which is returned to the data server corresponding thereto, the CD-ROM having in its memory the information or network address and the return, together with the associated transactional protocol can take place with or without encrypting.

The system of the invention also permits the use of a games CD-ROM and/or the direct connection to an official games organization.

For example, a user can play games in place on the CD-ROM, but all transactions would be carried out directly with an official organization. As a result of the invention, several users can play together. All the transactions would be performed and validated by the official organization.

In the field of tourism, the system according to the invention by the use or not of a CD-ROM storing the brochure of a travel agency, makes it possible to e.g. display the climatic conditions, photographs of the area, the hotel, the room, the price conditions, the transportation means, etc. and then permits the ordering of an aircraft ticket, room reservation, etc.

In an advantageous application the system of the invention can be used for accepting an order in a remote buying or shopping system. Thus, up to now a remote shopping operation has taken place in the following way. A user viewing a television transmission, e.g. on a public network, sees an object offered for sale on his television screen and which is of interest to him, must telephone a given number to contact an operator and therefore order the object in question. Such a manner of operating involves numerous random variables due in particular to the delay between the purchase decision and the effective communication with the operator, with the possibility of "arriving" too late, the object already having been reserved.

The invention permits the operation of a remote buying system in which the user, once he has made his purchase decision, can immediately validate it with the aid of the ordering means.

Thus, the system of the invention permits the display on the screen of a remote or non-remote sale transmission with the presentation of objects for sale. This can also consist of traditional publicity transmissions. As soon as he detects an object 50 which he wishes to acquire, the user 17 operates the ordering means, which then sends a signal enabling the transaction to be performed.

If the identification module has previously been activated by the correct code, e.g. by reading an electronic card 51, the ordering signal is then immediately sent to the remote processing network via the transmission-reception module or modules.

Figure 3:
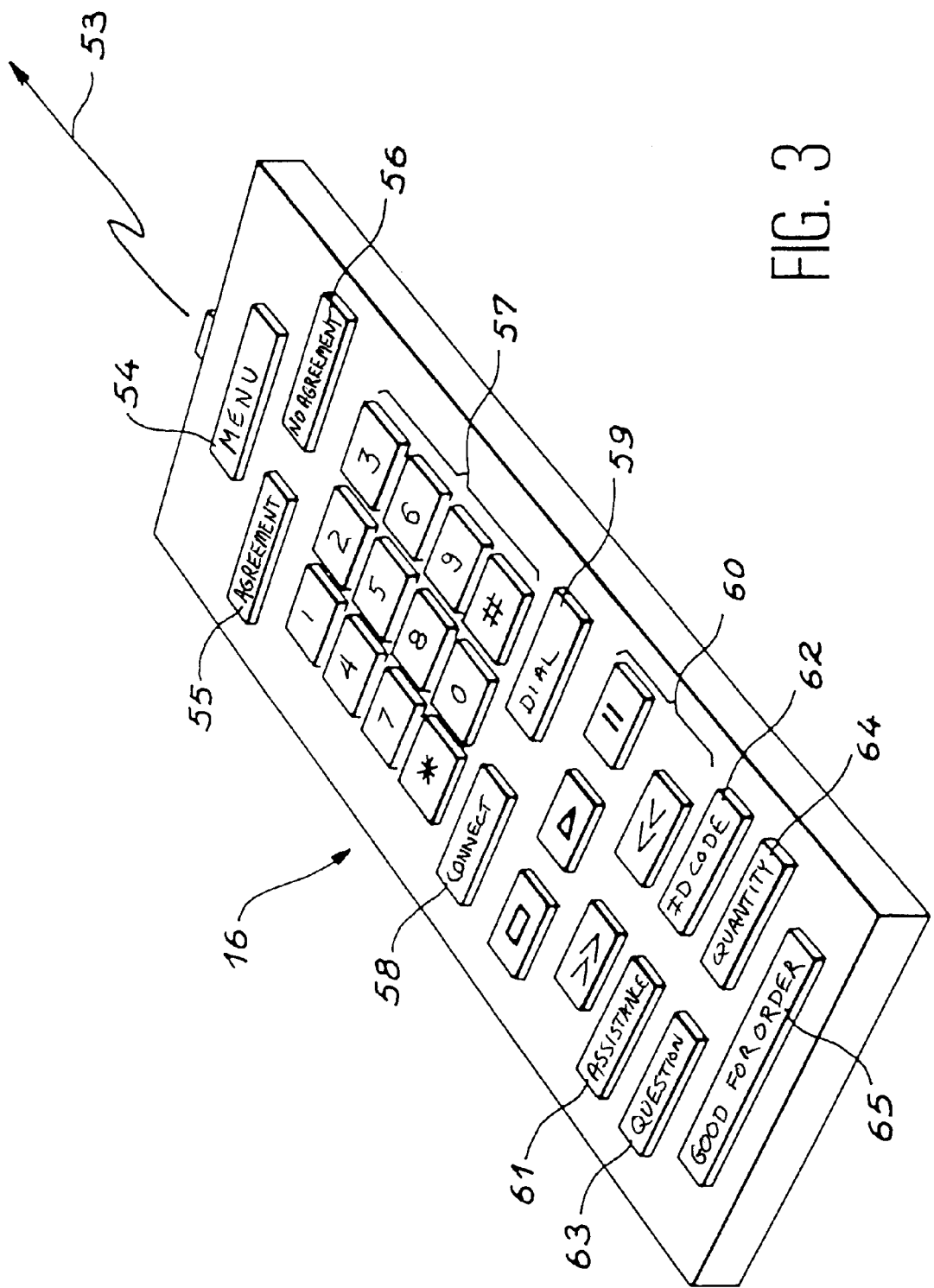
FIG. 3 illustrates a remote control in the system of the invention.
Figure 4:
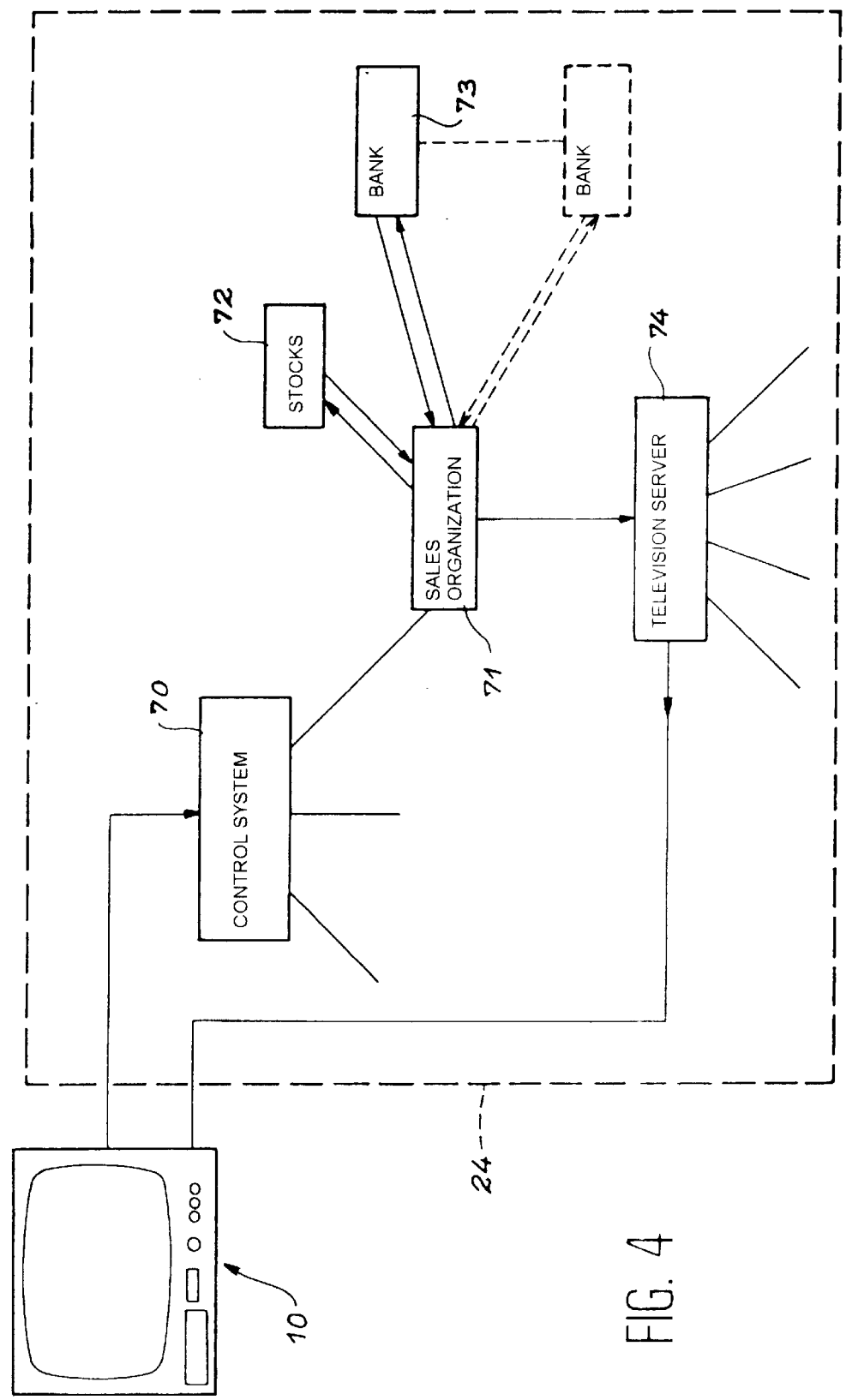
FIG. 4 illustrates a remote shopping network to which the system of the invention is linked.

The ordering means 16 used with the system according to the invention can be of the type shown in FIG. 3 with an e.g. infrared remote control 53. It can have the following buttons or keys:

"menu" (54): permitting a choice e.g. after introducing a CD-ROM,

"agreement" (55), "no agreement" (56): to reply e.g. to a poll, conventional keyboard keys 1 to 9, * and # (57), "connection" (58) for connection to the digital network, "dial" (59): for dialling a subscriber number, keys: advance, return, pause: ▷▷, ◁◁, ■, "(60), "assistance" (61): for requesting assistance, "ID code" (62): for entering his identification number, "question" (63): for asking the server a question, "quantity" (64): corresponding to the number of articles ordered, "good for order" (65): which is the validation of an order.

For studying the information transfer in the digital or analog information outward and/or return network 24, in exemplified manner consideration is given to a remote buying network. In said network the ordering signal is received by a central system 70 making it possible to distribute the information to where it has to go. This information is then sent to a sales organization 71, which can check its stocks 72 by controlling the data base, contact the bank 73 of the user 17 and then send a signal to the television server 74, which then supplies to the communication module of the system according to the invention a message showing that the order has been accepted. This message can then be restored in overprinting form on the display and/or listening means, with a possible printing of an acknowledgement of receipt on the printer 21.

In this connection it should be noted that the "transmitter" organization can interactively select pictures, sounds and data, which are sent to the user as a function of his actions.

The system according to the invention renders transactions secure. Successively the following are provided: a control/order by the user 17, a certification by the server in question 64 and a validation by the processing unit 42. The processing unit 42 makes it possible to check that the access codes are in accordance with the procedure in question and if the latter is not respected, there is no validation.

The information outward/return networks 24 are based on cable, satellite, television, radio GSM, RNIS, infrasound, carrier currents, etc. or by any mixing of these networks, which are able to deal with any type of protocol: ATM, FDDI, Ethernet, MNP,$X_{xx}$, $CCITT_{xx}$, Bell, TCPIP, etc.

The auxiliary reception signal 25 can be a signal received by a television by means of an antenna.

The reception signals 24 can be television signals received by an antenna or by cable, satellite, telephone, GSM, radio, etc. The transmission signals 24 can be transmitted by cable, antenna, satellite, GSM, radio, etc.

The system according to the invention chooses its outward and return as a function of its configuration.

In the same way as there has been validation, there can be a cancelling of the purchase by operating a special function of the ordering means 16.

The assembly 47 shown in FIG. 2 can form a box separate from the television receiver. It can then function by insertion on the connection socket, e.g. of the Peritel or Scart type of a standard television receiver.

In an embodiment, the system according to the invention can be based on existing networks with a box according to the invention connected to a standard television receiver. A telephone line, a transmitter and/or receiver of the GSM type can then be directly connected to said box.

In an advantageous application it is possible to use a small camera 40, associated with a microphone 41 which may or may not be remotely controlled and detachable or not, with respect to the box or alongside the television and directed towards the user 17.

This variant of the invention then makes it possible to carry out "videotelevision", i.e. to enter in relation with one or more users also in possession of the system according to the invention and its variant, the picture of the other user or users then appearing on the screen of the television set in variable sizes. The data rate in question is then adapted and is a function of the chosen size of the image to be transmitted or received, thus optimizing the information data transfer rate, which could be technically controlled by the transmitter or by the receiver or receivers. This variant also permits telemonitoring.

The use of such a camera 40 controls informations passing via the compression module 39 in order to reduce the flow rate of informations which are returned and the same applies for the microphone.

The system of the invention also permits any information transfer between several users, e.g. films, recordings, data, etc. It can be associated with a particularly sophisticated encrypting device permitting a completely confidential transmission.

The system according to the invention can operate with a digital signal processor, which permits the real time modification of an information received by the user. This can e.g. be the blanking out of the voice and/or the picture of a singer with the overprinting of a sound and/or a picture chosen by the user. It is also possible to modify the decor on the picture.

Such a system incorporating a microphone input enables the user to regulate the key of the sound so as to be "tuned" with the singer.

This can advantageously be the replacement of a text in a particular language by its instantaneous translation with a recording possibility. Thus, it is possible to have a simultaneous translation either by the user with or without microphone, or by a means 48 integrated into the system according to the invention.

The system of the invention also permits a processing of the picture: size increase or decrease, sharpness improvement, zoom, lateral displacement, blurring, colour treatment, morphism, chroma-key or any other video processing.

A very convivial television ergonomics is possible with the system according to the invention which, instead of text or the like, can be replaced by moving or non-moving pictures, sound, moving or non-moving pictograms, etc.

We claim:

1. An "intelligent" television system linked with data processing systems by means of a digital or analog network, the intelligent television system comprising:
    a standard television receiver integrated with a set of modules, including:
        an encoding/decoding, compression/decompression module for digital information,
        a user identification module,
        a control module for controlling the television receiver and operable by a remote control means operated by a user,
        a communication module for receiving information from the network permitting return of acknowledgement of receipt signal and for sending information to the network permitting the acceptance of an order,
        an input/output module connectable to at least one "non intelligent" peripheral and to a local data processing network,
        an interface module connected to at least one camera associated with at least one microphone making it possible to send back a picture and/or a sound chosen by the user,
        a processing unit connected to each of said modules, the processing unit connected to a memory being used for processing information transmitted or received by the television receiver; and
        a teleloadable "macro-routine" loading module for loading "macro-routines" into the memory for influencing operating parameters of the processing unit.

2. System according to claim 1, further comprising at least one instantaneous acquisition means.

3. System according to claim 1, further comprising a CD-ROM-type optical disk reader.

4. System according to claim 1, further comprising a remote control means.

5. System according to claim 1, further comprising a separate box having:
    the encoding/decoding, compression/decompression module of digital information,
    the user identification module,
    the module for validating an order in conjunction with a control box in the hands of a user,
    the communication module,
    the processing unit, and
    the input/output module.

6. System according to claim 1, wherein the local data processing network comprises a computer used for storing information transmitted or received by the television receiver.

7. System according to claim 6, wherein the television receiver and the computer form an "intelligent" television.

8. System according to claim 1, wherein the television receiver is identified by a unique, internal, specific code number.

9. System according to claim 1, wherein the user identification module is an electronic card reading module.

10. System according to claim 1, wherein the user identification module is a voice module.

11. System according to claim 1, wherein the user identification module is a reception module of a code which can be transmitted by a remote control.

12. System according to claim 1, wherein the microphone and camera are remotely controllable.

13. System according to claim 1, further comprising real time picture and sound processing means permitting editing of all or parts of picture and/or sound and/or data by modification or by substitution.

14. System according to claim 1, further comprising a processing unit permitting control of all transactions, routing of messages from at least one transmitter, sorting of messages sent by the user and return of messages in the desired direction.

15. System according to claim 1, further comprising a memory associated with the processing unit and a disk operating on a read-write basis permitting and extension of the memory.

16. System according to claim 1, further comprising at least one encrypting means associated with the compression/decompression means.

17. System according to claim 1, further comprising at least one electronic translation module.

18. System according to claim 1, wherein the set of modules is located inside the television receiver.

19. System according to claim 1, wherein the set of modules is located in a box separate from the television receiver.

* * * * *

UNITED STATES PATENT AND TRADEMARK OFFICE
CERTIFICATE OF CORRECTION

PATENT NO. : 5,905,521
DATED : May 18, 1999
INVENTOR(S) : Gatto et al.

It is certified that error appears in the above-identified patent and that said Letters Patent is hereby corrected as shown below:

Column 1, After Line 2, add the centered heading
--DESCRIPTION--.

Column 8, Line 54, Claim 15, delete "and" and insert --an--.

Signed and Sealed this

Ninth Day of November, 1999

*Attest:*

*Attesting Officer*

Q. TODD DICKINSON

*Acting Commissioner of Patents and Trademarks*